US 10,917,844 B2

United States Patent
Cho et al.

(10) Patent No.: US 10,917,844 B2
(45) Date of Patent: Feb. 9, 2021

(54) WIRELESS LOCAL AREA NETWORK POWER SAVING METHOD AND ACCESS POINT

(71) Applicant: FCI INC., Seongnam-si (KR)

(72) Inventors: Kyung Sik Cho, Seongnam-si (KR); Beom Jin Kim, Seongnam-si (KR)

(73) Assignee: Dialog Semiconductor Korea Inc., Seoul (KR)

( * ) Notice: Subject to any disclaimer, the term of this patent is extended or adjusted under 35 U.S.C. 154(b) by 134 days.

(21) Appl. No.: 16/163,613

(22) Filed: Oct. 18, 2018

(65) Prior Publication Data
US 2019/0159124 A1 May 23, 2019

(30) Foreign Application Priority Data
Nov. 23, 2017 (KR) ........................ 10-2017-0157561

(51) Int. Cl.
*H04W 52/02* (2009.01)
*H04W 84/12* (2009.01)
*H04W 88/08* (2009.01)

(52) U.S. Cl.
CPC ... *H04W 52/0206* (2013.01); *H04W 52/0229* (2013.01); *H04W 84/12* (2013.01); *H04W 88/08* (2013.01)

(58) Field of Classification Search
CPC ........... H04W 52/0206; H04W 52/229; H04W 84/12; H04W 88/08
See application file for complete search history.

(56) References Cited

U.S. PATENT DOCUMENTS

| | | | |
|---|---|---|---|
| 9,629,200 B2 | 4/2017 | Miklös | |
| 9,661,556 B2 | 5/2017 | Sawada | |
| 9,749,958 B1* | 8/2017 | Segev | H04W 52/0235 |
| 2013/0329576 A1* | 12/2013 | Sinha | H04W 52/0229 370/252 |
| 2014/0155029 A1* | 6/2014 | Kolaks | H04W 52/0251 455/411 |
| 2014/0211676 A1 | 7/2014 | Chhabra | |
| 2015/0237578 A1* | 8/2015 | Gogate | H04W 52/029 370/311 |

FOREIGN PATENT DOCUMENTS

WO 2014120537 A1 8/2014

OTHER PUBLICATIONS

Texas Instruments,"SimpleLinkTM CC3100/CC3200 Wi-Fi Internet-on-a-chipTM Networking Sub-system Power management", Application Report, SWRA462, Sep. 2014. available at: http://www.ti.com/lit/an/swra462/swra462.pdf.

* cited by examiner

*Primary Examiner* — Walter J Divito
*Assistant Examiner* — Anthony Luo
(74) *Attorney, Agent, or Firm* — Saile Ackerman LLC; Stephen B. Ackerman

(57) ABSTRACT

A wireless local area network power saving method and an access point are provided. The access point implements a sleep mode regardless of whether the access point connects to a station. Furthermore, the access point sets different access point wake-up time period depending on the situation whether the access point connects to the base station or not such that power saving effect is enhanced.

9 Claims, 7 Drawing Sheets

WIRELESS LOCAL AREA NETWORK POWER SAVING METHOD AND ACCESS POINT

FIELD OF INVENTION

The present invention relates to a wireless local area network power saving method and an access point.

BACKGROUND OF INVENTION

The following description is only used to provide background information related to the present invention, and does not constitute prior art.

Wireless local area network (WLAN) technologies provide broadband network access and are widely deployed in homes. WLAN technologies are generally called WIFI.

WLAN standard also includes a low power standby mode of "Power Save" mode of WLAN apparatus (Usually the apparatus is a station (STA)) that is alleged to lower power consumption of connection with the WLAN wireless internet.

In the IEEE 802.11 standard, use of power save mode increases lifespan of a WLAN station (STA).

The STA based on operation of the power save mode operates in an awake state or a sleep state for power saving. The awake state means states such as transmitting or receiving of frames or channel scan that the STA is able to normally operate for.

For a condition of an access point (AP) not connecting to the STA, operating the wireless (radio frequency, RF) electrical power (RF) in a power save mode shortens electrical power. For a condition of the AP connected to at least one STA, the power save mode is cancelled.

A typical AP uses an additional power supply device without need of energy saving functions, but an AP requiring a battery such as a mobile phone AP or a wireless flash drive (WFD), needs a power saving function.

SUMMARY OF INVENTION

Technical Issue to be Solved by the Present Invention

An objective of the present invention is to provide a wireless local area network power saving method and an access point (AP), comprising: operating the access point having a sleep mode enabled regardless of whether the AP connects to a station (STA); and distinguishing a condition of the access point connecting to the STA and a condition of the access point not connecting to the STA, and then setting different AP awaking period for the condition of the access point connecting to the STA and the condition of the access point not connecting to the STA to increase power saving effect.

Technical Solution for Solving the Technical Issue

Depending on one aspect of the present invention, an access point is provided and comprises: a sleep mode operation unit, wherein the sleep mode operation unit operates having a sleep mode enabled (On) regardless of whether the access point connects to the STA; a radio frequency (RF) communication module, transmitting (broadcasting) a beacon signal to an external environment, or transmitting data to or receiving data from the external environment; and a power saving timer control unit, wherein at each time point of arrival of a power saving timeout cycle (PS_Timeout_Periodic) set by the access point, the power saving timer control unit disables the sleep mode and enables the RF communication module during a power saving timeout (PS_Timeout) time period such that the access point transmits the data to or receives the data from the STA.

In another aspect, the present invention provides a wireless local area network power saving method, comprising: operating the access point having a sleep mode enabled regardless of whether an access point connects to a station (STA); identifying whether a power saving timeout cycle (PS_Timeout_Periodic) set in the access point arrives or not; and at each time point of arrival of the set power saving timeout cycle, disabling the sleep mode during the power saving timeout time period set in the access point, and enabling a RF communication module to make the access point transmit data to or receive data from the STA.

Effect of the Present Invention

As described above, the present invention has the following advantages. Regardless of the AP connects to the STA, the sleep mode is enabled. Because a condition of the AP connecting to the STA is distinguished from a condition of the AP not connecting to the STA to set different awaking periods such that power saving effect is enhanced. By the present invention, unnecessary power consumption of the AP is shortened.

DETAILED DESCRIPTION OF PREFERRED EMBODIMENTS

The present invention will be described in details with the appended figures as follows.

Figure 1:
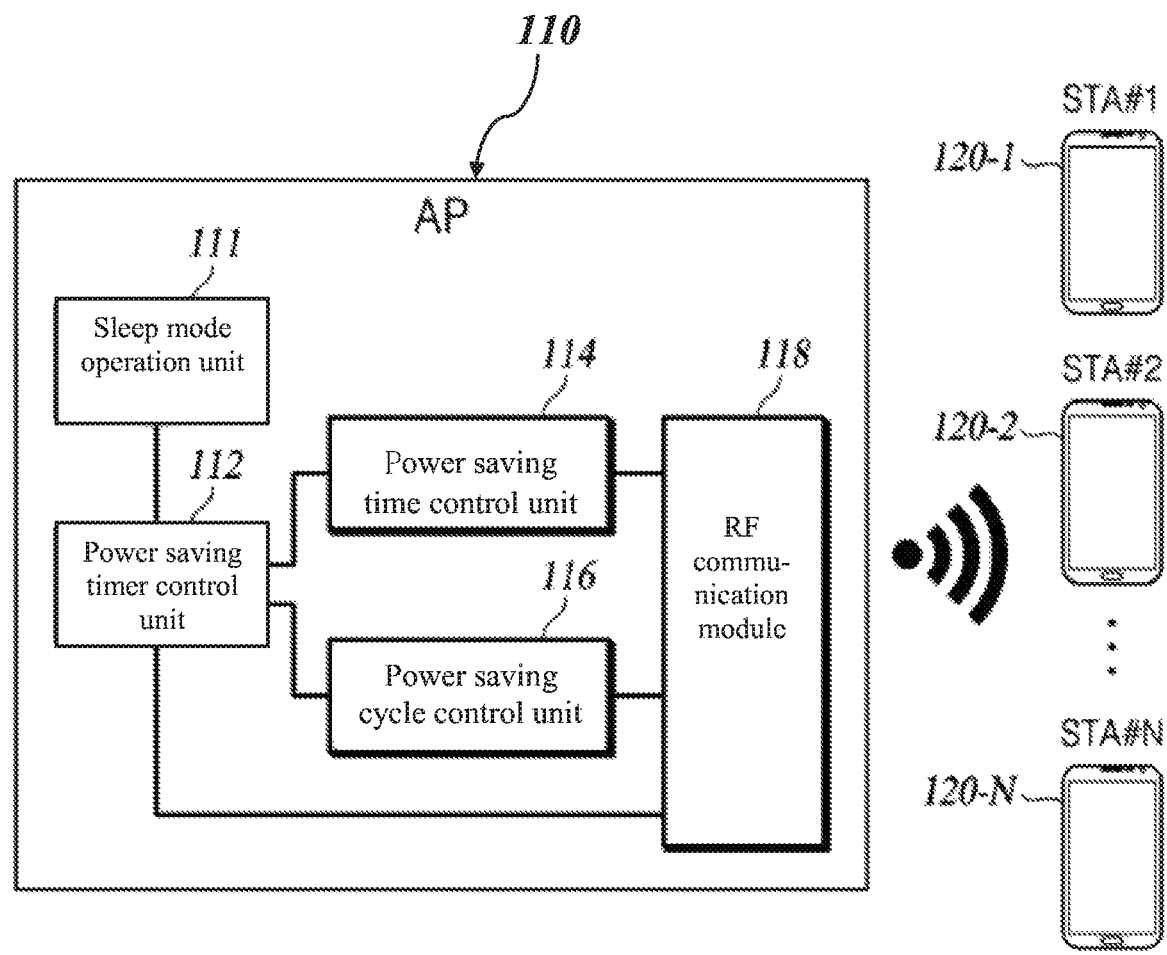
FIG. 1 is a structural block diagram briefly showing an access point (AP) in accordance with the present invention.

FIG. 1 is a structural block diagram briefly showing an access point (AP) in accordance with the present invention. The AP 110 of the present invention includes: a sleep mode operation unit 111, a power saving timer control unit 112, a power saving time control unit 114, a power saving cycle control unit 116 and a radio frequency (RF) communication module 118. Elements included in the AP 110 are not limited therein. Each of the units 111, 112, 114, 116 can be a computerized program stored in a memory disposed in the AP 110 and processed by a microprocessor disposed in the AP 110. The RF communication module 118 can be a program stored in the memory or a communication semiconductor chip disposed in the AP 110.

The AP 110 can be implemented by receiving a power supply from an external environment, but is preferably implemented by receiving a power supplied by a battery located in an internal.

In other words, the AP 110 is able to employ an additional power supply device. However, the AP, such as a mobile phone AP or a wireless flash drive (WFD), employing a battery, needs a power saving function.

Each element included in the AP 110 connects to a communication path of a software module or a hardware module connecting to an internal of the device and operates organically with other element. The elements employ at least one communication bus or a signal communication line.

Each element of the AP 110 shown in FIG. 1 refers to a unit processing at least one function or act, and is realized through the software module, a hardware module or a combination of software and hardware.

The AP 110 includes: a memory configured to store programs or protocols for communicating with stations (STAs) 120-1, 120-2, 120-N; and a microprocessor configured to implement a corresponding program to proceed with execution and control.

The AP 110 refers to an apparatus including: (i) a communication modem configured to communicate with various apparatuses or wired or wireless internets; (ii) a memory configured to store various programs or data; and (iii) a microprocessor configured to implement programs to proceed with execution and control. Depending on at least one embodiment, the memory refers to a computer readable recording or storing medium such as a random access memory (RAM), read only memory (ROM), a flash memory, a compact disc, a computer disk, a solid state disk (SSD). Depending on at least one embodiment, the microprocessor refers to a program selecting and implementing at least one act and function described in the specification.

Regardless of whether the AP 110 connects to the STAs 120-1, 120-2, 120-N, a sleep mode of the AP 110 is operated. The AP 110 distinguishes a condition of the AP 110 connecting to the STAs 120-1, 120-2, 120-N from a condition of the AP 110 not connecting to the STAs 120-1, 120-2, 120-N and sets different wake-up periods to enhance power saving effect for the conditions.

The AP 110, at a time point of a beacon signal transmission (BEACON TX), is awakened from the sleep mode and enables radio frequency. The AP 110 confirms whether transmission/reception (Tx/Rx) is implemented (For example, a number of transmission/reception (Tx/Rx) is counted), and adjusts a power saving timeout (PS(Power Saving)_Timeout) time and a sleep mode time depending on the power saving time and the condition whether transmission/reception (Tx/Rx) is implemented to reduce electrical power consumption. The AP 110, depending on the condition whether the AP 110 connects to the STAs 120-1, 120-2, 120-N, sets different power saving timeout (PS_Timeout) period to increases power saving effect.

The sleep mode operation unit 111 operates with the sleep mode enabled (On) regardless of whether the AP 110 connects to the STAs 120-1, 120-2, 120-N. The sleep mode operation unit 111 basically operates with the sleep mode enabled or off. The sleep mode operation unit 111 operates with the sleep mode enabled or off depending on a request of the power saving timer control unit 112.

The power saving timer control unit 112, at each time point of arrival of the power saving timeout cycle (PS_Timeout_Periodic) (For example, 50 ms) set in the AP 110, disables (Off) the sleep mode and enables the RF communication module 118 during a power saving timeout (PS_Timeout) time period (for example, initial 10 ms) such that a beacon signal is transmitted to the STAs 120-1, 120-2, 120-N or the AP 110 transmits data to or receives data from the STAs 120-1, 120-2, 120-N.

The power saving timer control unit 112, even in a condition of existence of a data packet to be transmitted or received during the interval in which the sleep mode is enabled, can disable the sleep mode. The power saving timer control unit 112 operates to enable the RF communication module 118 to make the AP 110 transmits data corresponding to the data packet or receive data corresponding to the data packet from the STAs 120-1, 120-2, 120-N.

The power saving time control unit 114, depending on whether data transmission/reception (Tx/Rx) between the AP 110 in a disable period of the sleep mode with the STAs 120-1, 120-2, 120-N is implemented, extends or shortens the power saving timeout (PS_Timeout) time period.

The power saving time control unit 114, during an interval in which the sleep mode is disabled and the RF communication module 118 is enabled, depending on a condition of the data transmission/reception (Tx/Rx) between the AP 110 and the STAs 120-1, 120-2, 120-N occurring over the power saving timeout (PS_Timeout) time period (For example, 10 ms) set initially, compares the overtime to a power saving timeout (PS_Timeout) time period and then extends the power saving timeout (PS_Timeout) time period (For example, 30 ms) of a next power saving timeout cycle.

The power saving time control unit 114, during the extended power saving timeout (PS_Timeout) time period (For example, 30 ms) at the time point of arrival of the power saving timeout cycle (PS_Timeout_Periodic) time (For example, 50 ms) (an interval of operation with the sleep mode disabled and with the RF communication module 118 enabled), disables the sleep mode, and enables the RF communication module 118.

The power saving time control unit 114, at a time point of arrival of the power saving timeout (PS_Timeout_Periodic) period (For example, 50 ms) (the interval of operation with the sleep mode disabled and with the RF communication module 118 enabled), depending on a condition of a time of the data transmission/reception (TX/RX) between the AP 110 and the STAs 120-1, 120-2, 120-N not reaching the extended power saving timeout (PS_Timeout) time period (For example, 30 ms), compares to the extended power saving time period and then shortens a next power saving timeout (PS_Timeout) time period (For example, 20 ms).

The power saving cycle control unit 116 distinguishes a condition of the AP 110 connecting to the STAs 120-1, 120-2, 120-N from a condition of the AP 110 not connecting to the STAs 120-1, 120-2, 120-N, and sets different power saving timeout cycles (PS_Timeout_Periodic) for the conditions.

The power saving cycle control unit 116, depending on the condition of the AP110 not connecting to the STAs 120-1, 120-2, 120-N, sets the power saving timeout cycle (PS_Timeout_Periodic) to be longer than a standard value (about "100 ms").

At each time point of arrival of the set longer power saving timeout cycle (PS_Timeout_Periodic) (For example, 100 ms), the power saving cycle control unit 116, during the power saving timeout (PS_Timeout) time period (For example, initial 10 ms), disables the sleep mode, and enables the RF communication module 118.

The power saving cycle control unit 116, depending on the condition of the AP110 connecting to the STAs 120-1, 120-2, 120-N, sets the power saving timeout cycle (PS_Timeout_Periodic) to be shorter than the standard value (about "50 ms").

The power saving cycle control unit 116, at each time point of arrival of the set shorter power saving timeout cycle (PS_Timeout_Periodic) (For example, 50 ms), disables the sleep mode and enables the RF communication module 118 during the power saving timeout (PS_Timeout) time period (For example, initial 10 ms).

The RF communication module 118 transmits the beacon signal to the external environment, or transmits data to or receives data from the external environment. The RF communication module 118 serves as a communication apparatus for implementing functions associated with the STAs 120-1, 120-2, 120-N, and implements a function of transmitting of beacon signal or of transmitting or receiving data.

Figure 2:
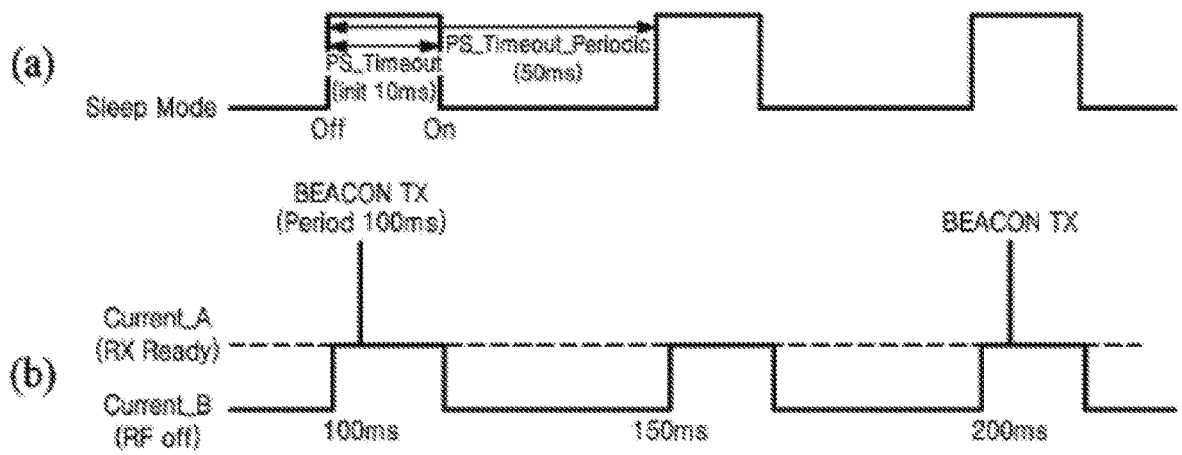
FIG. 2 is a schematic view for illustrating a beacon period of the present invention.

FIG. 2 is a schematic view for illustrating a beacon period of the present invention.

As shown in FIG. 2(a), regardless of whether the AP 110 connects to the STAs 120-1, 120-2, 120-N, the AP 110 implements the sleep mode enabled. Regardless of whether the AP 110 connects to the STAs 120-1, 120-2, 120-N, the AP 110, disables the sleep mode and enables the RF communication module 118 during the power saving timeout (PS_Timeout) time period (For example, initial 10 ms), depending on the power saving timeout cycle (PS_Timeout_Periodic) (For example, 50 ms).

As shown in FIG. 2(b), the AP 110, at each time point of arrival of the power saving timeout cycle (PS_Timeout_Periodic) (For example, 50 ms) disables the sleep mode and enables the RF communication module 118, to transmit a beacon signal (Beacon Tx) during the power saving timeout (PS_Timeout) time period (For example, initial 10 ms).

In other words, for a condition of the AP 110 disabling the sleep mode and enabling the RF communication module 118 to transmit beacon signal (Beacon Tx) when passing through the time point of "100 ms", at each time point "150 ms" and "200 ms" of arrival of the power saving timeout cycle (PS_Timeout_Periodic) (For example, 50 ms), the AP 110 disables the sleep mode and enables the RF communication module.

As shown in FIG. 2(a), after the AP 110 disables the sleep mode, as shown in FIG. 2(b), after the RF communication module 118 is enabled, the AP 110 transmits (Tx) beacon signal if beacon transmit time, and inspects transmission/reception (Tx/Rx) of signals during the power saving timeout (PS_Timeout) time period (For example, 10 ms).

The AP 110, during the power saving timeout (PS_Timeout) time period, disables the RF communication module 118 again and enters the sleep mode. The AP 110, during the wake-up power saving timeout (PS_Timeout) time period, inspects transmission/reception (Tx/Rx) of signals and extends or shortens a next power saving timeout (PS_Timeout) value depending on whether transmission/reception of the data is made.

The AP 110, in a condition of no existence of transmission/reception (Tx/Rx) of signals, shortens the power saving timeout (PS_Timeout) value, and increases the time in which the APP 110 is in the sleep mode to lower the power consumption. The period in which the AP 110 is awakened irrelevant to transmission/reception of the data, set by the AP 110, is the power saving timeout cycle (PS_Timeout_Periodic).

Figure 3:
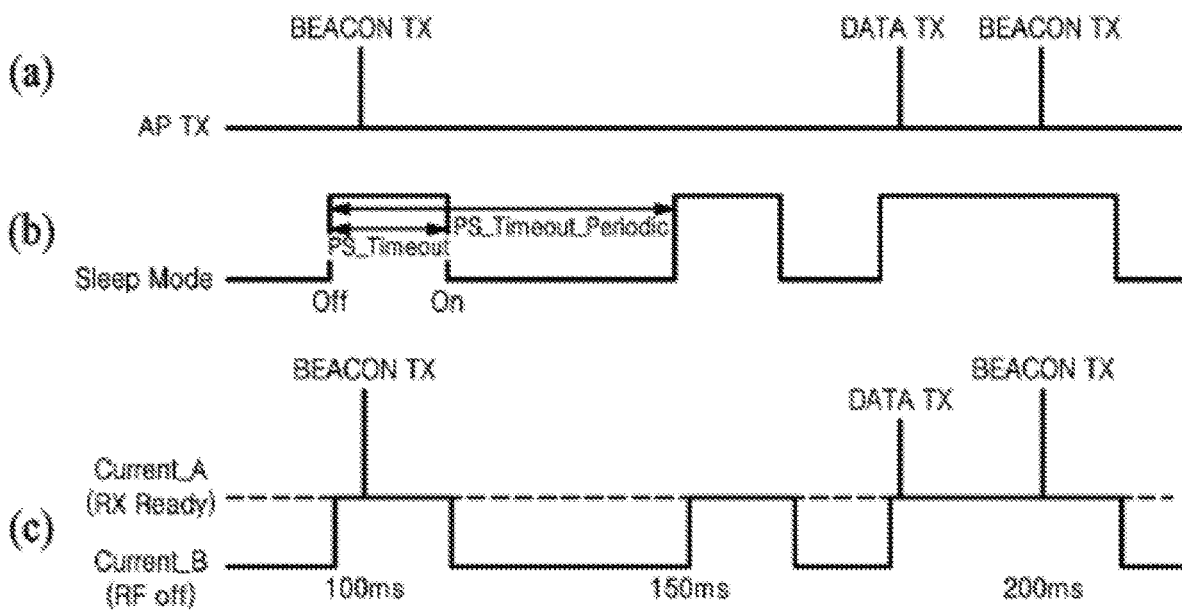
FIG. 3 is a schematic view for illustrating data transmission under a sleep mode of the present invention.

FIG. 3 is a schematic view for illustrating data transmission under the sleep mode of the present invention.

As shown in FIG. 3(a), the AP 110 transmits the beacon signal (Beacon Tx), and transmits data (Data Tx) depending on a condition of existence of a data packet to be transmitted.

As shown in FIG. 3(b), after the AP 110 disables the sleep mode, depending on a condition of passing through the power saving timeout (PS_Timeout), the AP 110 changes and enables the sleep mode. The AP 110 operates with the sleep mode enabled until each arrival of the power saving timeout cycle (PS_Timeout_Periodic).

The AP 110 operates with the sleep mode enabled until each arrival of the power saving timeout cycle (PS_Timeout_Periodic), but disables the sleep mode and transmits (Tx) the data when a data packet (Data) to be transmitted exists.

As shown in FIG. 3(c), the AP 110, depending on the power saving timeout cycle (PS_Timeout_Periodic) (For example, 50 ms), enables the RF communication module 118, disables the sleep mode and transmits (Tx) the data.

In other words, for the condition of the AP 110 transmits a beacon signal (Beacon Tx) when passing through the time point of "100 ms", the AP 110, depending on the power saving timeout cycle (PS_Timeout_Periodic) (For example, 50 ms), should disable the sleep mode at the time points of "150 ms" and "200 ms". However, for the condition of existence of a data packet to be transmitted in the AP 110, irrelevant to the power saving timeout cycle (PS_Timeout_Periodic), the AP 110 disables the sleep mode and can transmit the data.

As shown in FIGS. 3(a), (b), (c), the AP 110, even during the interval in which the sleep mode is enabled, disables the sleep mode and transmits (Tx) the data when a data packet (Data) to be transmitted exists.

Figure 4A:
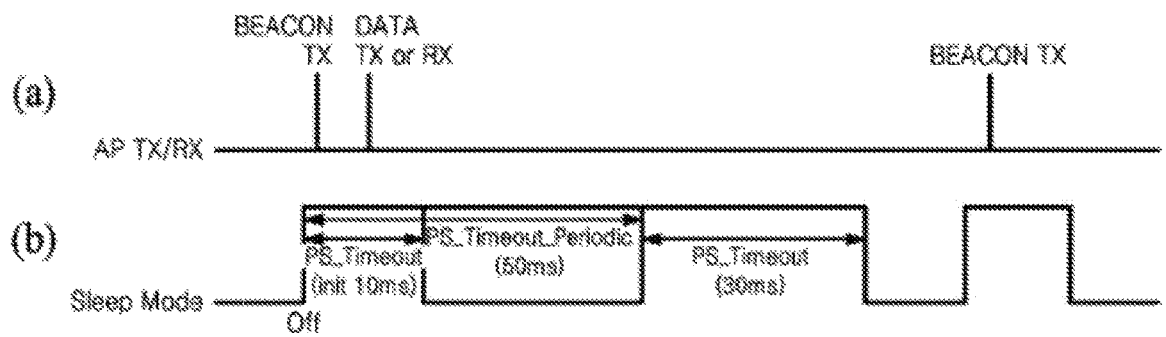
FIGS. 4a and 4b are schematic views for illustrating a power saving time in a disable period of the sleep mode of the present invention.
Figure 4B:
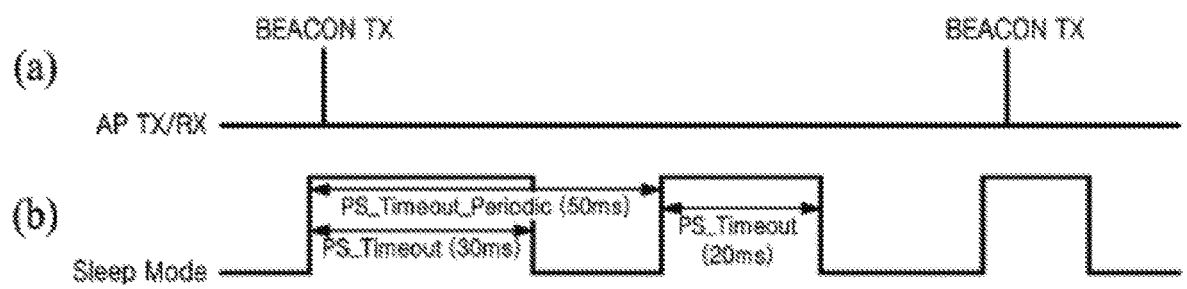

FIGS. 4a and 4b are schematic views for illustrating a power saving time in the disable period of the sleep mode of the present invention.

As shown in FIG. 4a, the AP 110, during an interval in which the sleep mode is disabled, depending on a condition of the transmission/reception (Tx/Rx) signal occurring, sets and increases a next power saving timeout (PS_Timeout) time period.

The AP 110, depending on the power saving timeout cycle (PS_Timeout_Periodic) (For example, 50 ms), enables the RF communication module 118, disables the sleep mode during the power saving timeout (PS_Timeout) time period (For example, initial 10 ms), and transmits (Tx) the Beacon.

The AP 110, depending on a condition of transmission (TX) or reception (RX) of the data occurring during the power saving timeout (PS_Timeout) time period (For example, initial 10 ms), disables the sleep mode and enables the RF communication module 118 to transmit (Tx) the data during the power saving timeout cycle (PS_Timeout_Periodic) time, i.e., the extended power saving timeout (PS_Timeout) time period (For example, 30 ms) at the time point (50 ms).

As shown in FIG. 4b, depending on a condition of no transmission/reception (Tx/Rx) of signal occurring during an interval of the AP 110 disabling the sleep mode, the AP 110 sets and shortens a next power saving timeout (PS_Timeout) time period.

The AP 110, depending on the power saving timeout cycle (PS_Timeout_Periodic) (For example, 50 ms), enables the RF communication module 118, disables the sleep mode during the extended power saving timeout (PS_Timeout) time period (For example, 30 ms) and transmits (Tx) the Beacon.

The AP 110, depending on a condition of no transmission (Tx) or reception (Rx) of signal occurring during the extended power saving timeout (PS_Timeout) time period (For example, 30 ms), disables the sleep mode and enables the RF communication module 118 to transmit (Tx) the data during the power saving timeout cycle (PS_Timeout_Periodic) time, i.e., the power saving timeout (PS_Timeout) time period (For example, 20 ms) shortend at the time point of 50 ms.

Figure 5A:
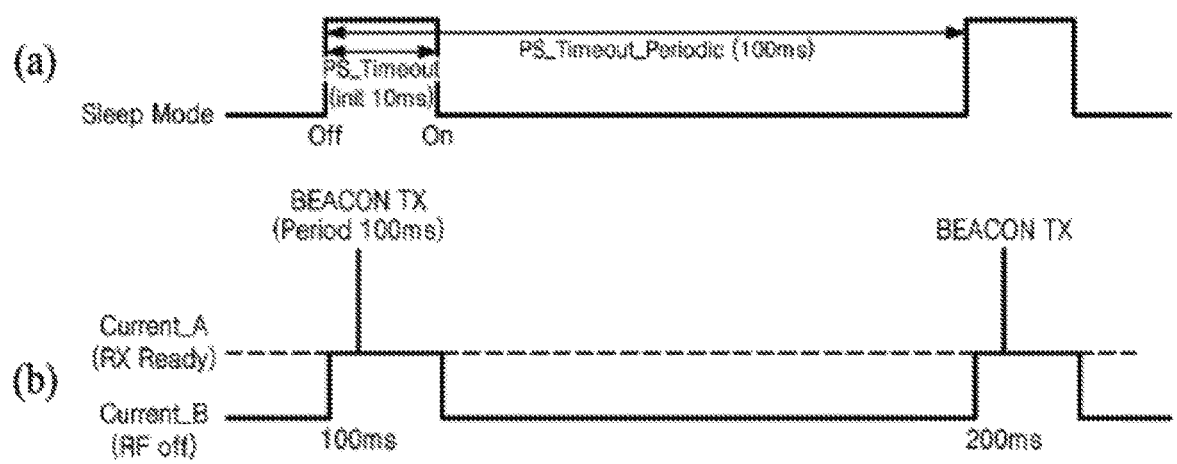
FIGS. 5a and 5b are schematic views for illustrating a setting of the power saving time period of the present invention.
Figure 5B:
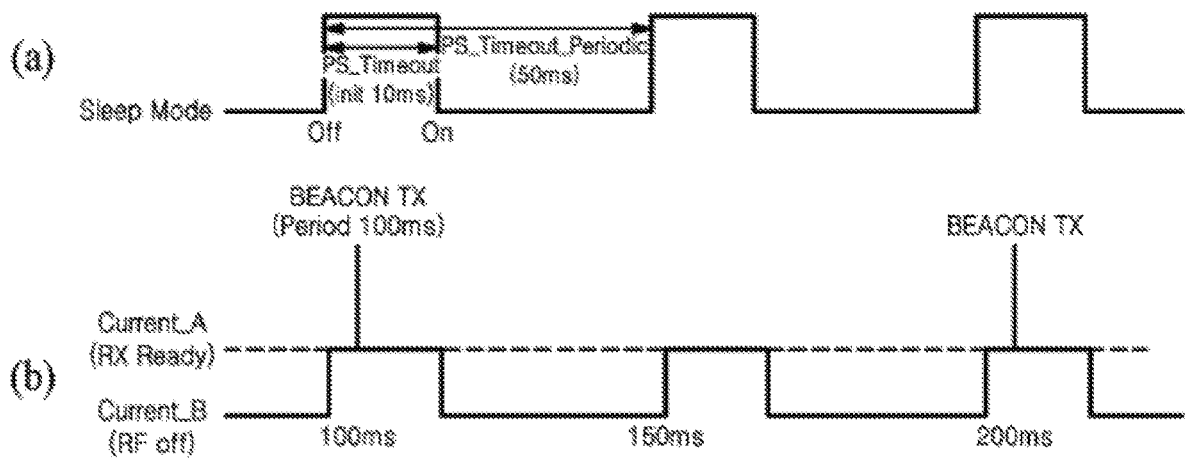

FIGS. 5a and 5b are schematic views for illustrating a setting of the power saving time period of the present invention.

As shown in FIG. 5a, the AP 110, depending on a condition of the AP 110 connecting to the STAs 120-1, 120-2, 120-N and a condition of the AP 110 not connecting to the STAs 120-1, 120-2, 120-N, sets different ones of the power saving timeout cycle (PS_Timeout_Periodic) to reduce power consumption. For instance, depending on the condition of the AP 110 not connecting to the STAs 120-1, 120-2, 120-N(No Station Connected), the AP 110 sets the power saving timeout cycle (PS_Timeout_Periodic) to be about "100 ms" to reduce power consumption.

Depending on a condition of the AP 110 not connecting to the STAs 120-1, 120-2, 120-N, the AP 110 sets the power saving timeout cycle (PS_Timeout_Periodic) to be longer (For example, 100 ms).

For the condition of the AP 110 not connecting to the STAs 120-1, 120-2, 120-N, the AP 110, depending on the set power saving timeout cycle (PS_Timeout_Periodic) (for example, 100 ms), enables the RF communication module 118, disables the sleep mode during the power saving timeout (PS_Timeout) time period (For example, initial 10 ms) and transmits (Tx) the Beacon.

The AP 110 transmits (Tx) the data during the power saving timeout (PS_Timeout) time period (For example, initial 10 ms). When passing through the power saving timeout cycle (PS_Timeout_Periodic) time, i.e., the time point of 100 ms, the AP 110 disables the sleep mode, enables the RF communication module 118 and transmits (Tx) the beacon.

As shown in FIG. 5b, the AP 110, depending on the conditions the AP 110 connecting to and not connecting to the STAs 120-1, 120-2, 120-N, sets different ones of the power saving timeout cycle (PS_Timeout_Periodic) to lower power consumption. For instance, for the condition of the AP 110 connecting to the STAs 120-1, 120-2, 120-N(Station Connected), the AP 110 sets the power saving timeout cycle (PS_Timeout_Periodic) to be about "50 ms" to lower the power consumption.

For the condition of the AP 110 connecting to the STAs 120-1, 120-2, 120-N, the AP 110 sets the power saving timeout cycle (PS_Timeout_Periodic) to be shorter (For example, 50 ms).

For the condition of the AP 110 connecting to the STAs 120-1, 120-2, 120-N, the AP 110, depending on the power saving timeout cycle (PS_Timeout_Periodic) (For example, 50 ms) set in the AP 110, enables the RF communication module 118, and disables the sleep mode and transmits (Tx) the Beacon.

The AP 110 transmits (Tx) the data during the power saving timeout (PS_Timeout) time period (For example, initial 10 ms), and when each time passing through the power saving timeout cycle (PS_Timeout_Periodic) time, i.e., the time point of 50 ms, the AP 110 disables the sleep mode and enables the RF communication module 118.

Figure 6:
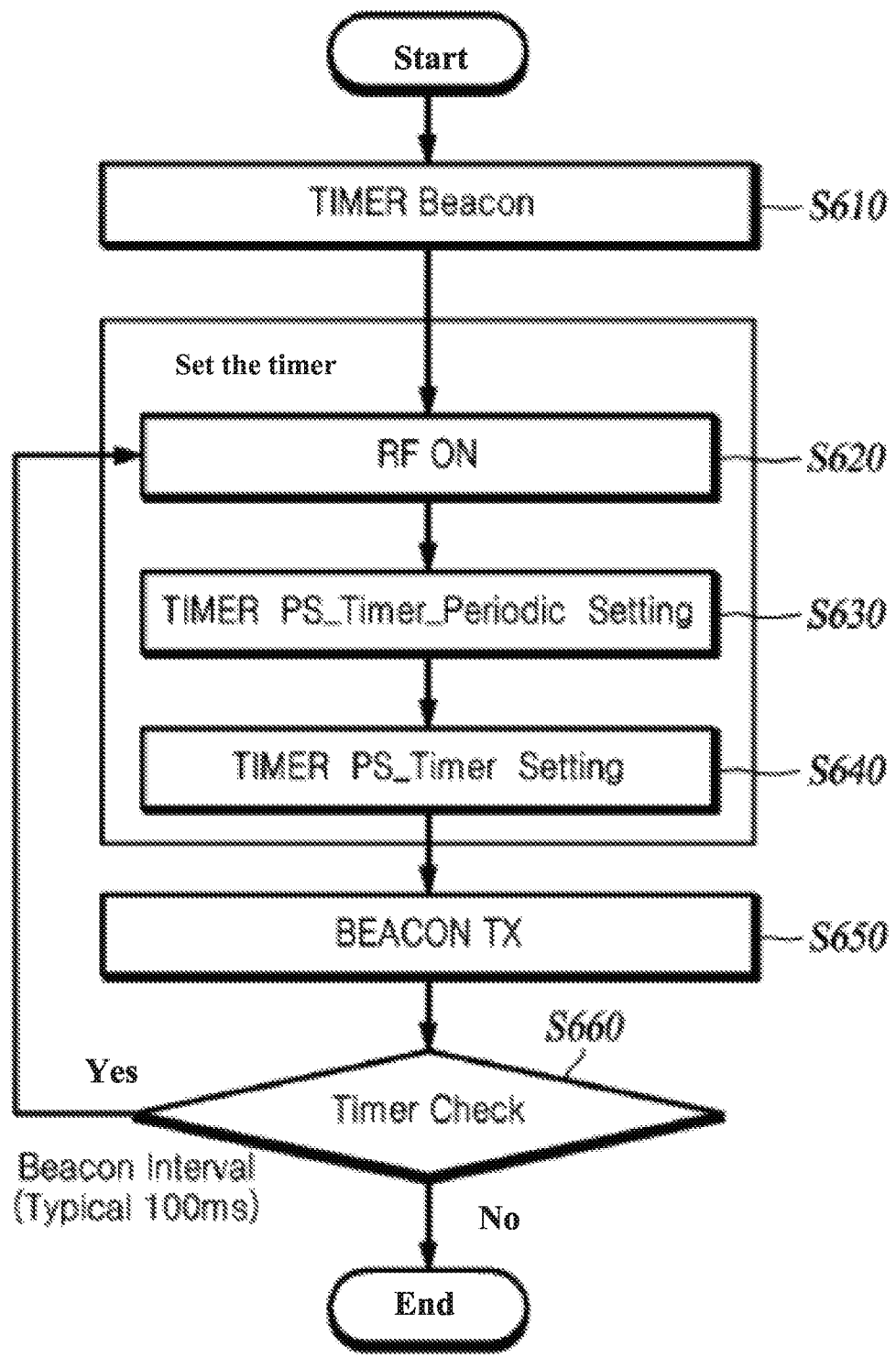
FIG. 6 is a schematic flowchart for illustrating a setting method for a beacon timer of the present invention.

FIG. 6 is a schematic flowchart for illustrating a setting method for a beacon timer of the present invention.

The AP 110 drives beacon timer (TIMER Beacon) (step S610). The AP 110 enables the RF communication module 118 (RF ON) for setting the beacon timer (step S620).

The AP 110 sets the power saving time period (PS_Timer_Periodic) (step S630) of the beacon timer. In the step S630, the AP 110, depending on a condition of the AP 110 connecting to the STAs 120-1, 120-2, 120-N (STA Connected), sets the power saving time period to be "50 ms". The AP 110, depending on a condition of the AP 110 not connecting to the STAs 120-1, 120-2, 120-N (No STA Connected), sets the power saving time period to be "100 ms".

The AP 110 sets the power saving time (PS_Timer) of the beacon timer (step S640). In the step S640, the AP 110 initially sets the power saving timeout (PS_Timeout) time period to be "10 ms" (Init 10 ms).

The AP 110 transmits (Tx) beacon if beacon transmit time (step S650). The AP 110 identifies whether the set power saving time (PS_Timer) (Timer Check) has passed (step S660).

An identifying result of the step S660, for a condition of passing through the power saving time (PS_Timer) set in the AP 110, the AP 110, depending on a beacon interval (Beacon Interval) (For example, "100 ms"), implements the step S620 again.

FIG. 6 describes the sequentially implemented step S610 to step S660, but is not limited hereby. In other words, the steps described in FIG. 6 can be changed and performed or more than one of the steps can be performed in parallel. FIG. 6 is not for purposes of limiting the time sequence of the steps.

As described above, the beacon timer operating method of the present invention described in FIG. 6 is implemented by programs and is recorded in a computer-readable recording medium. The computer-readable recording medium, recording the program of the beacon timer operating method of the present invention includes all recording devices storing data can be read by computer systems.

Figure 7:
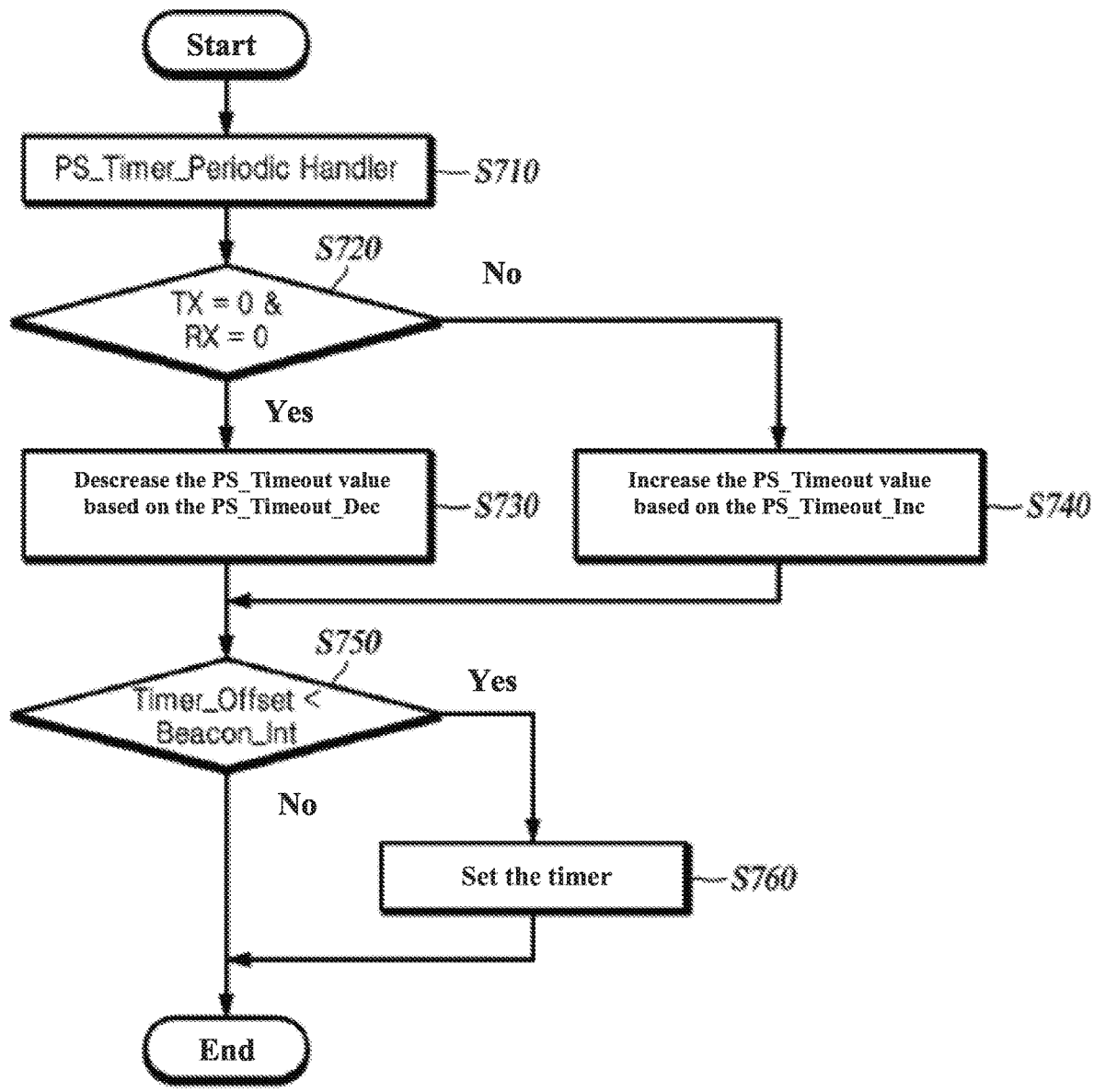
FIG. 7 is a schematic flowchart for illustrating a setting method for the power saving time period of the present invention.

FIG. 7 is a schematic flowchart for illustrating a setting method for the power saving time period of the present invention.

The AP 110 operates a power saving time period handler (Handler) to set the power saving time period (PS_Timer_Periodic) (step S710).

In the step S710, the AP 110, depending on a condition of the AP 110 connecting to the STAs 120-1, 120-2, 120-N (STA Connected), sets the power saving time period to be "50 ms". The AP 110, depending on a condition of the AP 110 not connecting to the STAs 120-1, 120-2, 120-N(No STA Connected), sets the power saving time period to be "100 ms".

The AP 110 confirms whether a number of transmission (Tx) and a number of reception (Rx) are "0" (Tx=0, Rx=0) (step S720).

In the step S720, the AP 110, depending on a condition of the number of the transmission (Tx) and the number of the reception (Rx) are "0" (Tx=0, Rx=0), decreases the power saving timeout (PS_Timeout) value based on a power saving timeout decreasing value (PS_Timeout_Dec) (step S730).

In the step S730, the AP 110, depending on whether data transmission/reception (Tx/Rx) is implemented, changed the power saving timeout (PS_Timeout) value to adjust a time in which the RF communication module 118 is enabled.

In the step S720, depending on a condition of the number of transmission (Tx) and the number of reception (Rx) are not "0" (Tx≠0, Rx≠0), the AP 110 increases the power saving timeout (PS_Timeout) value based on power saving timeout increasing value (PS_Timeout_Inc) (step S740).

In the step S740, the AP 110, depending on whether data transmission/reception (Tx/Rx) is implemented, changes the power saving timeout (PS_Timeout) value to adjust the time in which RF communication module 118 is enabled.

The AP 110 confirms whether a timer disabling setting value (Timer_Offset) fails to reach a beacon transmitting interval (Beacon_Int) (Timer_Offset<Beacon_Int) (step S750).

The step S750 includes that the AP 110 confirms whether the set timer disabling setting value (Timer_Offset) fails to reach a time point of transmitting a next beacon signal, i.e., the beacon transmitting interval (Beacon_Int).

In the step S750, depending on a condition of the timer disabling setting value (Timer_Offset) failing to reach a time point of transmitting a next beacon signal, i.e., the beacon transmitting interval (Beacon_Int) (Timer_Offset<Beacon_Int), the AP 110 returns to the step S620 shown in FIG. 6 (S760).

FIG. 7 describes the sequentially implemented step S710 to step S760, but is not limited hereby. In other words, the steps described in FIG. 7 can be changed and performed or more than one of the steps can be performed in parallel. FIG. 7 is not for purposes of limiting the time sequence of the steps.

As described above, the power saving time period setting method of the present invention described in FIG. 7 is implemented by programs and is recorded in a computer-readable recording medium. The computer-readable recording medium, recording the program of the power saving time period setting method of the present invention includes all recording devices storing data can be read by computer systems.

Figure 8:
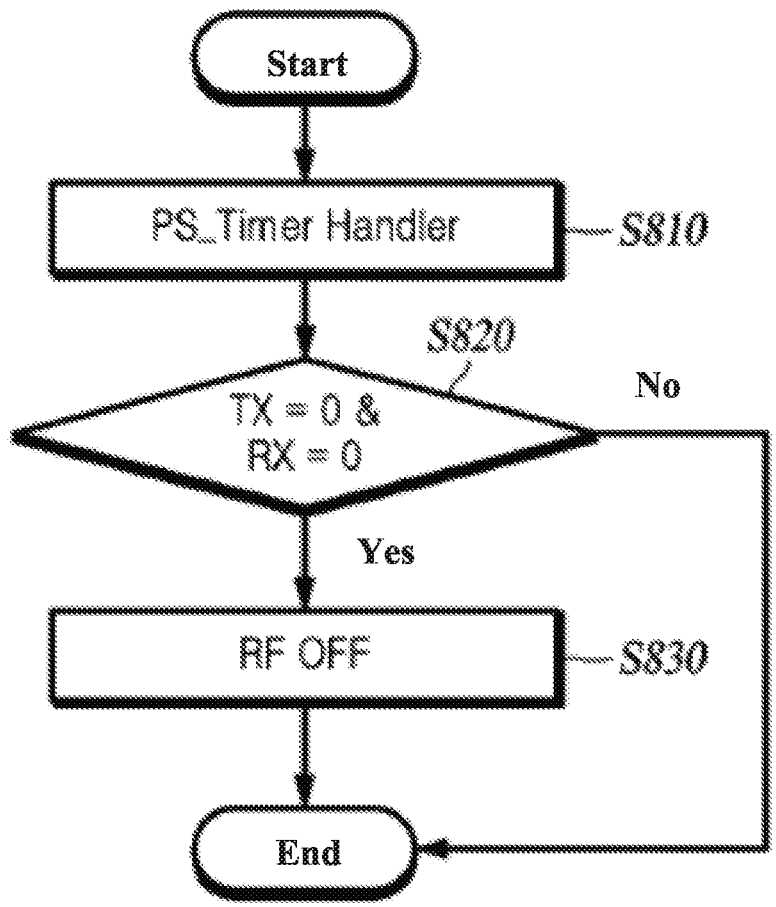
FIG. 8 is a schematic flowchart for illustrating a setting method for the power saving time of the present invention.

FIG. 8 is a schematic flowchart for illustrating a setting method for the power saving time of the present invention.

the AP 110 operates the power saving time handler (Handler) to set the power saving time (PS_Timer) (step S810). In the step S810, the AP 110 initially sets the power saving timeout (PS_Timeout) time period to be "10 ms" (Init 10 ms).

The AP 110 confirms whether a number of transmission (Tx) and a number of reception (Rx) are "0" (Tx=0, Rx=0) (step S820).

In the step S820, depending on a condition of the number of the transmission (Tx) and the number of the reception (Rx) are "0", the AP 110 disables the RF communication module 118 (step S830).

In the step S830, the AP 110 inspects data transmission/reception (Tx/Rx) during the power saving timeout (PS_Timeout) time period, and disables the RF communication module 118 depending on a condition of the number of the transmission (Tx) and the number of the reception (Rx) are "0" (Tx=0, Rx=0).

FIG. 8 describes the sequentially implemented step S810 to step S830, but is not limited hereby. In other words, the steps described in FIG. 8 can be changed and performed or more than one of the steps can be performed in parallel. FIG. 8 is not for purposes of limiting the time sequence of the steps.

As described above, the power saving time setting method of the present invention described in FIG. 8 is implemented by programs and is recorded in a computer-readable recording medium. The computer-readable recording medium, recording the program of the power saving time setting method of the present invention includes all recording devices storing data can be read by computer systems.

The above descriptions are only for the purpose of exemplary explanation of the spirit of the present invention, a person of ordinary skill in the art of the present invention. Various modifications and changes can be made without departing from the essential characteristics of the present invention. Therefore, the present invention is not intended to limit the technical idea of the present invention, and the scope of the technical idea of the present invention is not limited by the embodiment. The scope of protection of the present invention is explained by claims. All technical ideas within the scope should be interpreted within the scope of the claims contained in the present invention.

What is claimed is:

1. An access point, comprising:
   at least one processor;
   a memory connected with the at least one processor, wherein the memory
      comprises at least one program instruction and the at least one processor executes the at least one program instruction to:
      disable a sleep mode of the access point and enable a radio frequency (RF) communication module during a power saving timeout time period of each power saving timeout cycle set by the access point;
      check whether data transmission or reception occurs during the power saving timeout time period; and
      extend or shorten the power saving timeout time period of a next power saving timeout cycle depending on a result of the checking, wherein the power saving timeout time period of the next power saving timeout cycle is shortened in a condition of no occurrence of the data transmission or reception such that the access point lowers a power consumption by increasing the time which the access point is in the sleep mode,
   wherein the sleep mode is enabled or disabled based on the power saving timeout time period of the power saving timeout cycle regardless of whether the access point connects to a station, and
   wherein the power saving timeout time period is set irrelevantly to a period of the data transmission or reception.

2. The access point as claimed in claim 1, wherein the access point, during an interval in which the sleep mode is disabled and the RF communication module is enabled, extends the power saving timeout time period of a next power saving timeout cycle depending on a condition of the data transmission or reception between the access point and the station occurring over the power saving timeout time period set initially.

3. The access point as claimed in claim 2, wherein the access point disables the sleep mode, and enables the RF communication module during the extended power saving timeout time period at a time point of arrival of the power saving timeout cycle.

4. The access point as claimed in claim 3, wherein the access point, at a time point of arrival of the power saving timeout cycle, compares to the extended power saving timeout time period and then shortens a next power saving timeout time period depending on a condition of a time of the data transmission or reception between the access point and the station not reaching the extended power saving timeout time period.

5. The access point as claimed in claim 1, wherein the at least one processor further executes the at least one program instruction to:

set the power saving timeout cycle depending on whether the access point connecting to the stations.

6. The access point as claimed in claim 5, wherein the access point, depending on a condition of the access point not connecting to the station, sets the power saving timeout cycle to be longer than a standard value, such that the access point disables the sleep mode and enables the RF communication module during the power saving timeout time period of the longer power saving timeout cycle.

7. The access point as claimed in claim 5, wherein the access point, depending on a condition of the access point connecting to the station, sets the power saving timeout cycle to be shorter than the standard value such that the access point disables the sleep mode and enables the RF communication module during the power saving timeout time period of the longer power saving timeout cycle.

8. The access point as claimed in claim 1, wherein the access point, even in a condition of existence of a data packet to be transmitted or received during the interval in which the sleep mode is enabled, changes the sleep mode to be disabled, and enables the RF communication module such that the access point transmits data corresponding to the data packet to or receives data corresponding to the data packet from the station.

9. A power saving method of an access point, comprising:

disabling a sleep mode of the access point and enabling a radio frequency (RF) communication module during a power saving timeout time period of each power saving timeout cycle set by the access point;

checking whether data transmission or reception occurs during the power saving timeout time period; and extending or shortening the power saving timeout time period of a next power saving timeout cycle depending on a result of the checking, wherein the power saving timeout time period of the next power saving timeout cycle is shortened in a condition of no occurrence of the data transmission or reception such that the access point lowers a power consumption by increasing the time which the access point is in the sleep mode, wherein the sleep mode is enabled or disabled based on the power saving timeout time period of the power saving timeout cycle regardless of whether the access point connects to a station, and wherein the power saving timeout time period is set irrelevantly to a period of the data transmission or reception.

* * * * *